(12) United States Patent
Croce et al.

(10) Patent No.: US 9,366,317 B2
(45) Date of Patent: Jun. 14, 2016

(54) BACKLASH-FREE PLANETARY GEAR ASSEMBLY

(75) Inventors: Paolo Croce, Cugnasco (CH); Rolando Berta, Bioggio (CH)

(73) Assignee: FAULHABER MINIMOTOR SA, Croglio (CH)

( * ) Notice: Subject to any disclaimer, the term of this patent is extended or adjusted under 35 U.S.C. 154(b) by 114 days.

(21) Appl. No.: 14/348,868

(22) PCT Filed: Dec. 7, 2011

(86) PCT No.: PCT/EP2011/072014
§ 371 (c)(1),
(2), (4) Date: Mar. 31, 2014

(87) PCT Pub. No.: WO2013/083188
PCT Pub. Date: Jun. 13, 2013

(65) Prior Publication Data
US 2014/0309071 A1 Oct. 16, 2014

(51) Int. Cl.
*F16H 1/28* (2006.01)
*F16H 57/08* (2006.01)
*F16H 1/46* (2006.01)

(52) U.S. Cl.
CPC ................ *F16H 1/2863* (2013.01); *F16H 1/46* (2013.01); *F16H 57/082* (2013.01)

(58) Field of Classification Search
CPC .................................................... F16H 1/2863
See application file for complete search history.

(56) References Cited

U.S. PATENT DOCUMENTS

2007/0093354 A1  4/2007  Berger

FOREIGN PATENT DOCUMENTS

| EP | 1 813 504 A1 | 8/2007 |
| GB | 780 855 A | 8/1957 |
| WO | WO 2013/083188 A1 | 6/2013 |

OTHER PUBLICATIONS

European Patent Office, "Search Report" in application No. PCT/EP2011/072014, dated Jul. 2, 2012, 3 pages.
Claims in European Application No. PCT/EP2011/072014, dated Jul. 2012, 2 pages.

*Primary Examiner* — Erin D Bishop
(74) *Attorney, Agent, or Firm* — Hickman Palermo Becker Bingham LLP

(57) ABSTRACT

A backlash-free planetary gear assembly comprising at least a first planet carrier member (4) and a second planet carrier member (5), which are rotatable relative to each other around the axis (7) of said assembly, and are connected by elastic means (10, 14) arranged to elastically react to a rotation between said planet carrier members, said elastic means being tensioned when said first member and second member are rotationally aligned in a design operation condition, so that the assembly, in use, is preloaded with a torque which tends to rotate said first planet carrier member relative to said second planet carrier member, in order to recover backlash.

16 Claims, 8 Drawing Sheets

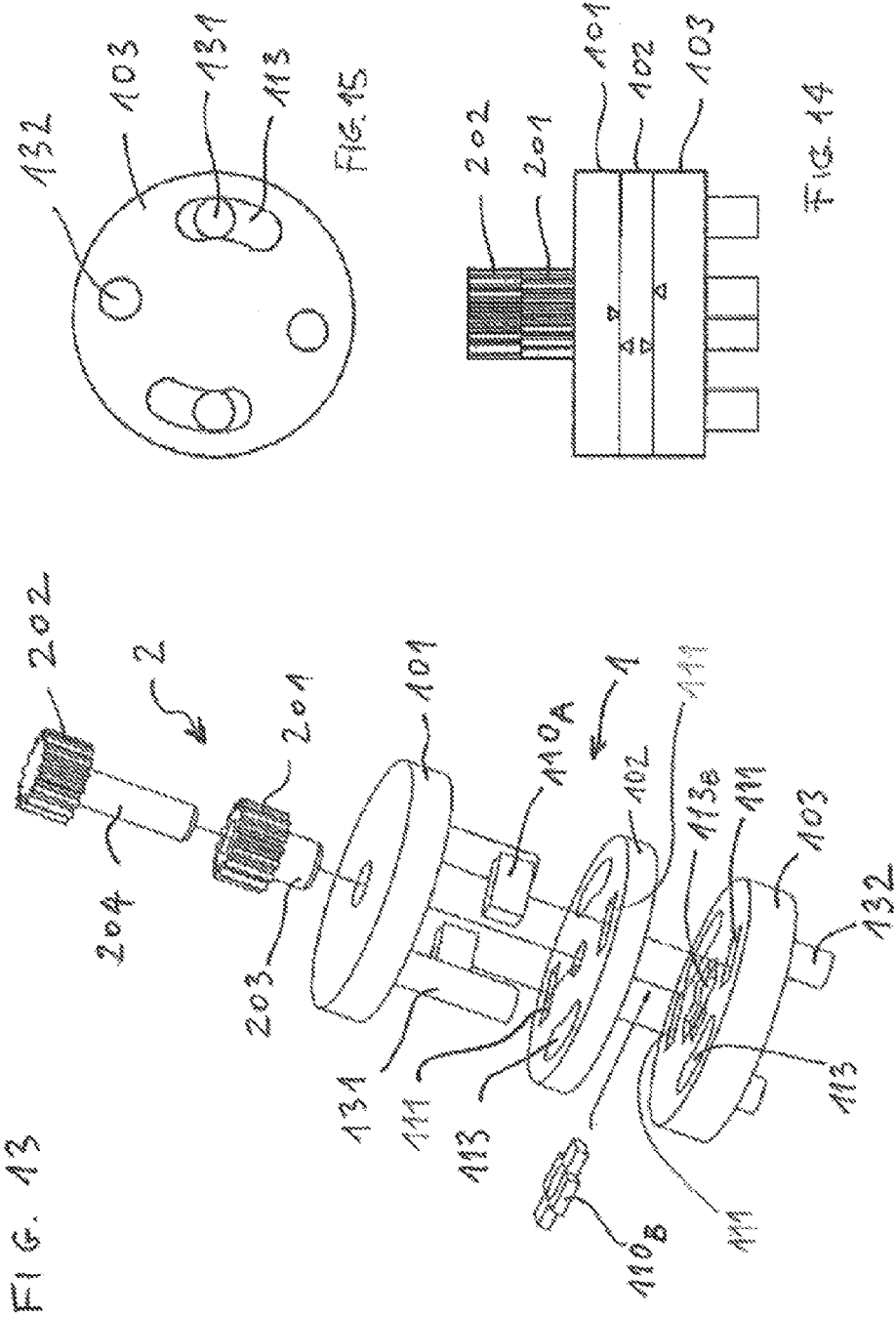

BACKLASH-FREE PLANETARY GEAR ASSEMBLY

FIELD OF THE INVENTION

The invention relates to the field of planetary and hybrid gearings. The invention discloses a reduced backlash planetary gear and relates also to a gear reducer or multiplier comprising said reduced backlash planetary gear.

PRIOR ART

A planetary gear comprises a sun gear and at least one planet gear. The planet gear, or each planetary gear if more than one, are mounted on a planet carrier. The planet gears mesh with the sun gear and, where provided, with an outer ring or annulus. Usually the planet carrier rotates relative to the sun gear so that the planet gears revolve around said sun gear. Planet gears are also called planet wheels or just planets.

The planetary gear is a well known kind of epicyclic gear and has several advantageous features, including a notable transmission ratio in a compact package. Planetary gears are widely used for example in gear reducers coupled with electric motors. Higher reduction can be reached by multi-stage reducers comprising several planetary stages, or hybrid reducers comprising one or more conventional non-epicylic stages (e.g. spur stages) with one or more planetary stages.

A problem faced by planetary gear reducers, or in a planetary gear stage, is to reduce backlash. Backlash is the clearance (or play) between the gears; a planetary stage in particular is affected by backlash between the planet gears and the sun gear and/or annulus. Elimination of the backlash is desirable especially in a planetary gear which needs to operate in both directions of rotation, since any clearance/play between the gear wheels generates an idle angle of rotation every time the rotation is reversed. This idle rotation may e.g. affect the precision of a servomotor unit including the planetary gear. A planetary gearhead can be used as a reducer or ratio multiplier, in both cases a reduced backlash is desirable to improve accuracy.

Many attempts have been made, up to now, to minimize the backlash and obtain reduced backlash planetary gear units. A planetary gear with a reduced backlash is also termed a "backlash-free" planetary gear.

WO 2009/106222 discloses a planetary gear unit where each planet gear is divided into a first planet subgear and a second planet subgear, and where the first planet subgear is preloaded relative to the second planet subgear by a spring bar arranged in the two planet subgears substantially parallel to the planetary axis of rotation. One spring bar or a plurality of spring bars are subject to a bending load and are supported in the two planet subgears; said spring bars are arranged around the planetary axis of rotation, and at least one spring bar is arranged in a first recess of the first planet subgear and in a second recess of the second planet subgear; said first and second recesses extend up to and into the area of the plane of division; the first recess and the second recess are made as holes widening towards the plane of division.

WO 2010/132912 discloses a planetary gear comprising a sun gear, a planet carrier having planet wheels, and a ring gear, wherein the planet wheels are elastically mounted on the planet carrier independently of each other. Planet wheels comprise a toothed ring and a bearing bushing; the toothed ring is seated on the bearing bushing by way of an interposed elastic element.

The above embodiments basically provide a preload of the planetary gears by including an elastic element in the planet wheels. A drawback is that they require a complicated design of the planet wheels, namely to manufacture planet wheels comprising at least two subparts with small holes for accommodating spring bars, or comprising two ring parts for insertion of an intermediate elastic ring. The above designs are then expensive and they are unpractical especially for small reducers, where the planet wheels may have a diameter of a few millimeters, for example 10 mm or less.

Another drawback of the above art is the noise produced due to the construction of the product made by using metal components which imply friction. Said friction also generates a higher wear, which means that the planetary gear rapidly looses the initial properties in terms of reduced backlash and accuracy.

Provision of an elastic member such as a spring for each planet wheel has the further disadvantage that the planetary gear comprises several and substantially independent elastic members acting on the sun gear. Hence it is more difficult to ensure that gear teeth receive a uniform tensioning force.

SUMMARY OF THE INVENTION

The technical problem underlying the invention is to overcome the above drawbacks of the prior art.

The idea underlying the invention is to preload a planet carrier instead of the planet wheels, in order to provide a desired preloading force. Said force is transferred to planet wheels and/or to a sun gear, according to various embodiments of the invention. Hence, the planet wheels can be made with a conventional design and they do not need to incorporate spring bars or other elastic members.

The problem is solved with a planetary gear assembly, comprising a central axis and at least one planet gear wheel which is distanced from said axis so that said planet wheel revolves around said axis when the gear assembly is in use, characterized by comprising at least a first planet carrier member and a second planet carrier member, which are rotatable relative to each other around said axis, and are connected by elastic means arranged to elastically react to a rotation between said planet carrier members, said elastic means being tensioned when said first member and second member are rotationally aligned in a design operation condition, so that the assembly, in use, is preloaded with a torque which tends to rotate said first planet carrier member relative to said second planet carrier member.

The invention provides two or more elastically connected planet carrier members which can rotate relative to each other, around said central axis. A rotary displacement between said planet carrier members compensate for backlash. The planet carrier members may be seen as parts of a planet carrier or separate planet carriers. According to some embodiment of the invention, a conventional planet carrier is split into two or more portions, connected by elastic means. According to other embodiments, the planetary gear assembly comprises two or more planet carriers which are elastically connected each other. The planet carrier members may have different shapes according to specific embodiments of the invention.

The planet wheels of a planetary gear assembly are typically engaged with a ring gear housing (annulus). According to some embodiments of the invention, the assembly may also comprise a sun gear for engagement with an adjoining stage, preferably with the planet wheels of an adjoining planetary assembly, for example in a multi-stage reducer.

According to various embodiments of the invention, the number of elastically connected planet carrier members may be two, three or a greater number. An assembly with two elastically connected planet carrier members allows optimize the backlash of the planet wheels versus the ring gear housing; an assembly with three (or more) members can also reduce the backlash of the planet wheels versus the sun gear.

According to still further embodiments, the sun gear of the inventive assembly is split into at least two axial portions which are rotatably relative to each other and connected to respective planet carrier members.

For example said sun gear comprises a first axial portion and a second axial portion, which are rotatable relative to each other around said central axis; a first axial portion of the sun gear is fixed to a first planet carrier member, and a second axial portion of the sun gear is fixed to a second planet carrier member. In further embodiments, the sun gear may comprise more than two portions, each portion being fixed to a respective planet carrier member.

In a preferred embodiment, axial portions of the sun gear are mounted on coaxial first and second shafts, for example an outer hollow shaft and a coaxial inner shaft. The first shaft is connected to a first planet carrier member, and the second shaft is connected to a second planet carrier member. Hence the elastic connection between planet carrier members provides a preload between said portions of the sun gear.

These embodiments result in the sun gear having two (or more) elastically preloaded axial portions. A sun gear with such elastically preloaded portions recovers the backlash of the planet wheels versus the sun gear itself.

According to some embodiments of the invention, the planet carrier members are separated by a plane of division which is perpendicular to the axis of rotation of the sun gear. For example, planet carrier members are in the form of substantially disc-like superimposed elements.

According to other embodiments of the invention, the planet carrier comprises two or more circular sectors connected by said spring means.

Preferably the elastic means comprise torsional spring means.

The planet carrier members are preferably coupled in the axial direction, though they can rotate relative to each other causing elastic deformation of the elastic means. In a preferred embodiment, an elastic element is partially inserted in a recess of a first planet carrier member, and the remaining part of said elastic element is inserted in a corresponding recess of a second (and possibly third, and so on, according to number of carrier members) so that when the elastic element is in place the first, second and following (if any) planet carrier members are axially coupled by the elastic element, but said elastic element provides a torsional spring between the planet carrier members.

The same elastic effect can be reached by connecting directly the planet carrier members, for example having the form of circular sectors, among them with an elastic element or a plurality of elastic elements.

The preferred embodiments of the invention provide that the elastic element or elements are made of a non metal material, for instance plastics, rubber, synthetic rubber or another material which allow the providing of the elasticity. However the invention can also be realized with spring means of a different nature, for example a spring, a metal spring or a plurality of them. The elastic elements can be mounted or, if made of rubber or similar, can be injected between the first and the second (or further) planet carrier members.

Some embodiments of the invention provide one single elastic element for connection between all the planet carrier members. A single elastic element is preferably arranged in the centre of the planet carrier members. Other embodiments provide a plurality of elastic elements, which may be arranged in a peripheral region of the planet carrier members, leaving a free space e.g. for allowing passage of a shaft. Embodiments with two or more elastic elements may be preferred to transmit a relevant torque.

The connection of the planet carrier members can be made by combining the above embodiments, for example with one central elastic element between two planet carrier members and a plurality of peripheral elastic elements for other stages.

In a preferred embodiment, the elastic means are embodied by at least one cross-shaped elastic member. This member is inserted into corresponding cross-shaped recesses of the planet carrier members. More in general, an elastic member is preferably shaped so that at least some contact surfaces between the mounting seats and the elastic member are not perpendicular to a radial direction passing by the centre of the planet carrier member. As a consequence, a rotation between the planet carrier members will change the shape of the elastic member and cause an elastic reaction of the same. This shape however is not essential, since a cylindrical or annular elastic member could be used. For example a cylindrical or annular elastic member could be tightly fitted into recesses of planet carrier members, in such a way that it provides the desired preload and torque.

The planetary gear of the invention may comprise one or more planet wheels revolving around the sun gear. Most common embodiments will have two, three or four planets but any arrangement is possible according to the known technique of planetary gears and epicyclic gears.

According to preferred embodiments, the planetary gear has one or more planets associated to each planet carrier members. In a preferred embodiment, a first planet shaft or a plurality of first planet shafts are integral with the first planet carrier member; second planet shaft(s) are integral with the second planet carrier members, and so on. The term planet shaft means a shaft for accommodation of a planet gear wheel.

The planet carrier members and the planet gears can be made with known materials including metals and plastics.

The invention relates also to a gear reducer or multiplier comprising a planetary gear according to the above. Said gear reducer or multiplier can be a multi-stage unit, or a hybrid reducer/multiplier comprising one or more planetary stage(s) and one or more conventional non-epicyclic spur stage(s). A gear reducer is understood as a gear that can be used to reduce a transmission ratio, also called reducer. A gear multiplier is understood as a gear that can be used to multiply a transmission ratio, also called multiplier.

In some embodiments, only one planetary stage of a multi-stage unit may include the above described preloaded planet carrier members, which means that this particular stage, which can be termed a backlash-recovery stage, will compensate for the backlash of the device. In other embodiments, a plurality of stages or even all planetary stages may feature the preloaded carrier members of the invention.

A great advantage of the invention is that the planet wheels are totally conventional and hence they are of a non-expensive design, since the ability to compensate for the backlash is given by the preloaded planet carrier members. Since the number of planets is greater than number of carriers (e.g. 3 or 4 planets each carrier) the overall cost can be reduced, compared to other solution which involves smaller elastic means inserted in the planet wheels. This feature is an advantage particularly for small reducers which typically have small planets with a diameter of a few millimeters, where a complicated design of the planets with internal springs or other elastic means would be too expensive, if feasible at all. Nevertheless, the invention is not limited to small devices and can be applied to planetary gears and planetary stages of any size.

The invention allows to steady compensate, in both directions, the backlash caused by wear of the teeth, while keeping the noise at the original level and maintaining the original characteristics of the product. One of the advantages of the invention is that the elastic members can be made with synthetic elastic materials whose properties allow keeping the noise at a lower level than in a conventional gearhead.

These and other features and advantages of the invention shall become clearer from the following detailed description and with the help of the attached figures.

DESCRIPTION OF THE FIGURES

FIG. 13 is an exploded view of an assembly according to another embodiment of the invention.

FIGS. 14 and 15 are a plane and front view of an assembly according to FIG. 13.

DETAILED DESCRIPTION OF PREFERRED EMBODIMENTS

Figure 1:
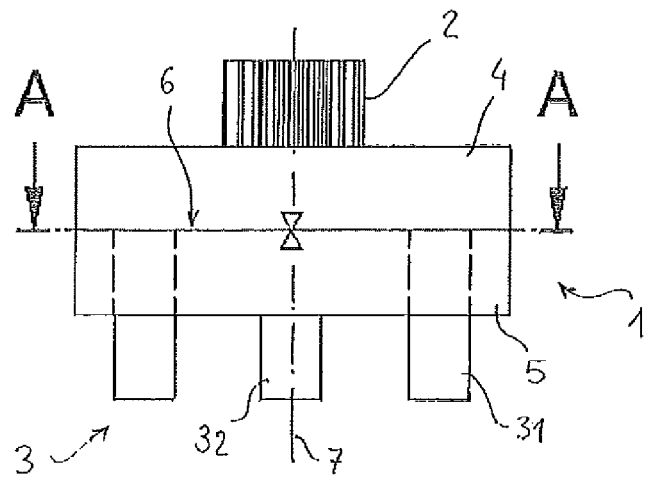
FIG. 1 is a front view of a planetary gear assembly according to a first embodiment of the invention.

FIG. 1 shows a first exemplificative embodiment of the invention. The figure illustrates a planetary gear assembly comprising a planet carrier 1, a central gear 2 arranged on a rear side, and a plurality of planet shafts 3 for carrying planet wheels (not shown) on a front side.

The planet carrier 1 comprises a first planet carrier member 4 and a second planet carrier member 5, which in this example are substantially disc-shaped parts separated by a plane of division 6. This plane of division 6 is perpendicular to a central axis of rotation 7. Said axis 7 is also the axis of a sun gear meshing the planet wheels mounted on the shafts 3, when the planetary gear is in use. Said axis 7 is normally also parallel to the axis of rotation of each planet.

Figure 2:
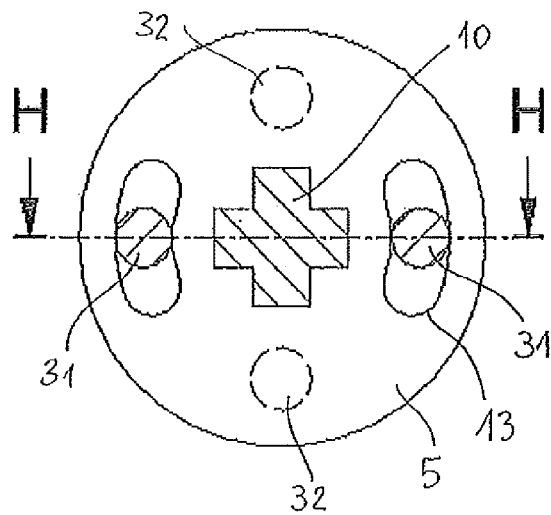
FIG. 2 is a sectional view according to plane A-A of FIG. 1.
Figure 3:
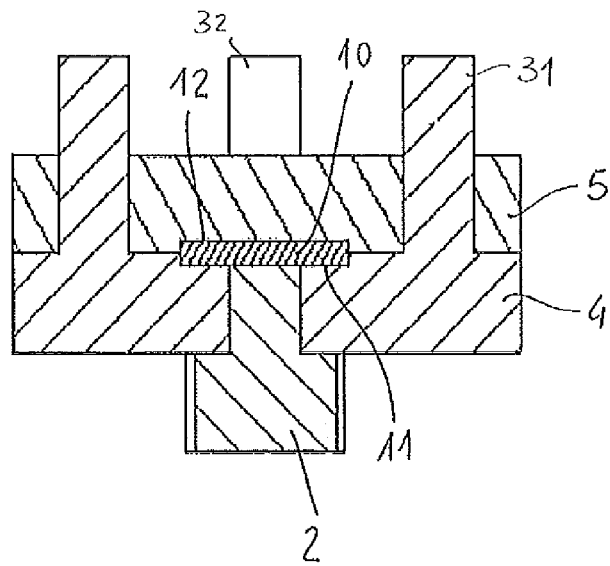
FIG. 3 is a sectional view according to plane H-H of FIG. 2.

Said planet carries members 4, 5 are rotary displaceable relative to each other on the plane 6, i.e. around axis 7. Said members 4, 5 are also elastically connected by elastic means which, in this embodiment, are made with an elastic member 10 as illustrated in FIGS. 2 and 3.

The elastic member 10 is a cross-shaped piece of a non-metal and elastic material like plastic, rubber or synthetic rubber, which is fitted or injected in respective cross-shaped recesses 11, 12 of the members 4 and 5, respectively.

It can be appreciated that, upon the connection with the elastic member 10, the planet carrier members 4, 5 are made integral in the axial direction of axis 7, but can still rotate relative to each other in the plane 6, namely around said axis 7, although a rotation will affect the elastic deformation of the member 10.

The planet carrier 1 of the example is designed to carry four planet wheels. Two first planets are associated to the first carrier member 4, and two second planets are associated to the second carrier member 5. To this purpose, the planetary gear comprises first planet shafts 31 which are integral with the first carrier member 4, and second planet shafts 32 which are integral with the second carrier member 5.

The first shafts 31 project from the first planet carrier member 4 and pass through slots 13 of the second planet carrier member 5, as seen in FIGS. 2 and 3, so that all planet shafts protrude from the same front side of the carrier 1.

The central gear 2 is fixed to the first carrier member 4. Said gear 2, in some embodiments of the invention, is the sun gear of an adjoining planetary stage, as will be explained below.

Figure 4:
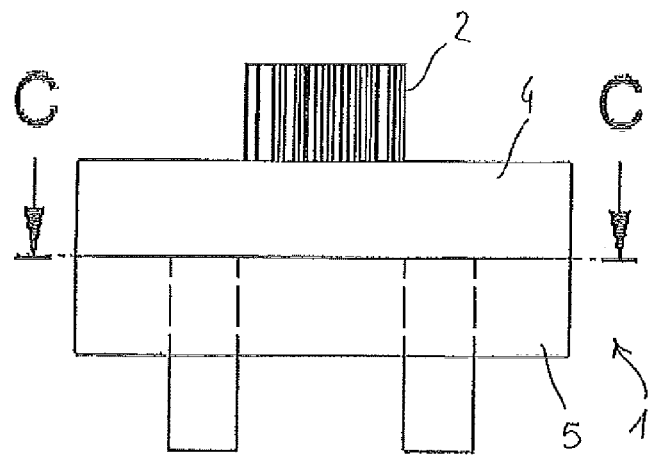
FIG. 4 is a front view of an assembly according to a second embodiment of the invention.
Figure 5:
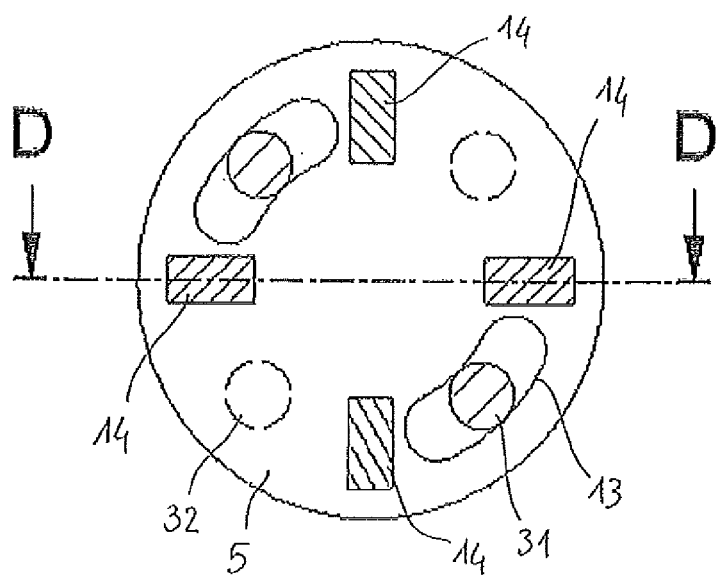
FIG. 5 is a sectional view according to plane C-C of FIG. 4.
Figure 6:
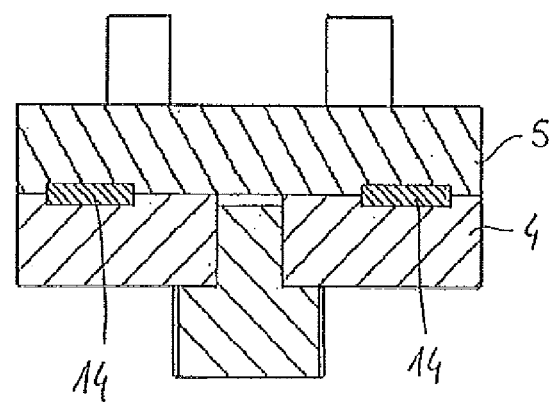
FIG. 6 is a sectional view according to plane D-D of FIG. 5.

FIGS. 4 to 6 disclose another embodiment where the elastic connection between the planet carrier members 4 and 5 is made with a plurality of small elastic blocks 14. Said elastic blocks 14 are preferably distributed in a peripheral region of the planet carrier 1 (FIG. 5), for example at 90 deg intervals, in such a way that the central region of the planet carrier is free, e.g. for passage of a shaft. The elastic blocks 14 are fitted in suitable recesses of the planet carrier members. Preferably the elastic blocks 14 are pieces of a non metal material, having a specific cross-section, as seen in FIG. 6.

This embodiment of FIGS. 4 to 6, compared to that of FIGS. 1 to 3, may be preferred to leave the centre of the planet carrier 1 free from connecting elements, which could be an advantage for example if a shaft must pass through the planet carrier 1. Embodiments of the invention with a central elastic element may also allow room for a central shaft, e.g. using an elastic interface element with annular shape instead of the cross-shaped member of FIGS. 1-3.

Figure 7:
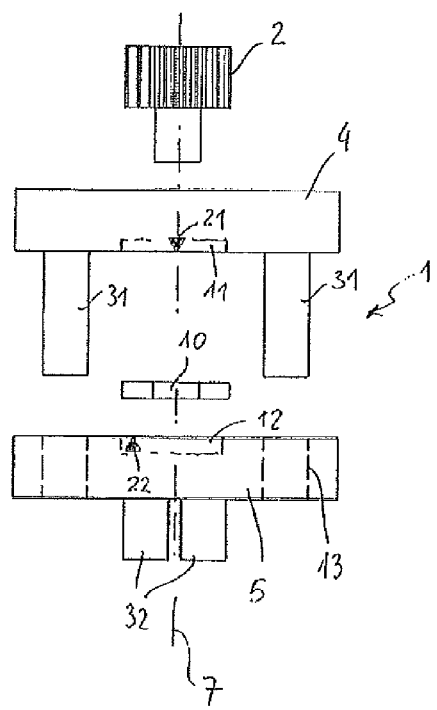
FIG. 7 is a view of the main components of the assembly of FIG. 1.

The exploded view of FIG. 7 shows the main components of the assembly of FIG. 1, namely the first planet carrier member 4, the second planet carrier member 5, the gear 2 and the cross-shaped elastic member 10.

Figure 8:
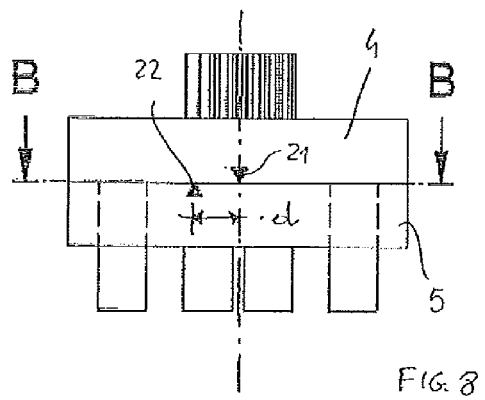
FIG. 8 is a view of the assembly of FIG. 1 showing a relative rotation between two planet carrier members, induced by the elastic member inside.

For the sake of clarity, in FIGS. 7 and 8 reference signs (arrows) 21 and 22 are indicated on the carrier members 4 and 5. When all the planet gear(s) are in their nominal (ideal) design position, the position of carrier members 4 and 5 should be such that signs 21 and 22 are aligned on the common axis 7. The planet carrier 1 is assembled in such a way that when the carrier members 4, 5 are in the ideally aligned condition, the elastic member 10 is tensioned. Hence the elastic reaction of the member 10 tends to rotate the carriers 4, 5 relative to each other, and away from the ideal design position. The elastic member 10, in other words, works as a torsional spring means between the carrier members 4 and 5.

The above purpose can be reached for example with a suitable arrangement of the recesses for accommodation of the elastic member(s). Referring for example to the particular embodiment with cross-shaped member 10 (FIGS. 1-3 and 7-9), bringing the cross-shaped recesses 11 and 12 in alignment for insertion of the member 10 will result in the carriers 4 and 5 being rotated away form alignment, as depicted in FIG. 7. In this way, when the planetary gear is put in operation and the carriers 4, 5 are brought to alignment (i.e. the references 21, 22 match), the elastic member 10 undergoes an elastic deformation and provides the required preload on the planet wheels.

Figure 9:
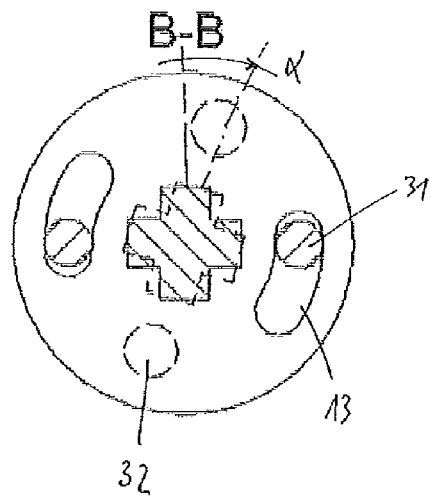
FIG. 9 is a cross section according to plane B-B of FIG. 8.

FIGS. 8, 9 show the assembled planet carrier 1 in a rest condition, i.e. when the elastic member 10 restores its original shape. The relaxation of the elastic member 10 keeps the carrier members 4 and 5 rotated by angle α and the references 21, 22 as a consequence are misaligned.

In operation the planet carrier is brought again to the aligned position, for allowing the planet gears reach their working position. The elastic member 10 will then provide a constant torque pushing the carrier member 5 and respective planets mounted on the shafts 32, to rotate relative to the carrier member 4 and planets mounted on the shafts 31, until the teeth of the planets find an abutment against teeth of the sun gear and/or outer annulus. This effect provides a self-recovery of backlash between the various gears. It may be noted that the angle α (FIG. 9) or projected distance "d" in FIG. 8 are proportional to the maximum backlash which is recoverable by the preloaded planet carrier 1.

Figure 11:
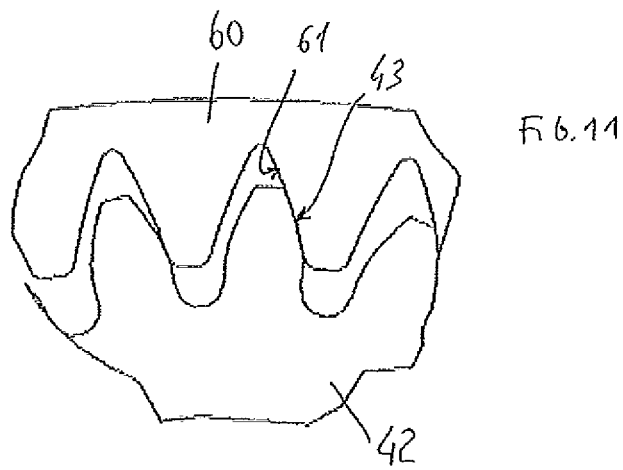
FIGS. 11 and 12 are enlarged details of FIG. 10 to show the ability of the inventive planetary gear assembly to compensate for backlash.
Figure 10:
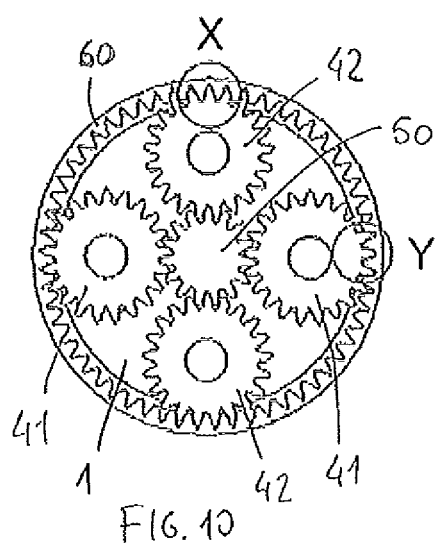
FIG. 10 is a sectional view of a planetary gear according to an embodiment of the invention.
Figure 12:
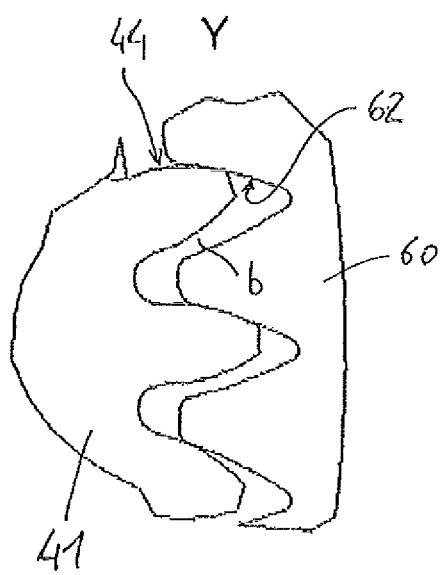

The above effect is further illustrated in FIGS. 10 to 12. FIG. 10 shows planets 41 associated to the first carrier member 4 via the shafts 31, and planets 42 associated to the second carrier member 5 via the shafts 32. The planets 41, 42 mesh with a sun gear 50 and an outer annulus or crown 60.

Under the preload of the planet carrier 1, the planets 41, 42 tend to rotate until their teeth abut against the teeth of crown 60 and/or against the teeth of the sun gear 50. The details "X" and "Y" are enlarged in FIGS. 11, 12 to show that a side 43, 44 of the teeth of the planets finds an abutment against sides 61, 62 of the crown 60, thus keeping constant contact and compensating for the backlash "b".

It can be noted that, looking at FIG. 10, the planet 42 tends to rotate clockwise under the action of the elastic means, so that for example the side 43 abuts against the crown side 61 as in FIG. 11; the planet 41 tends to rotate counter-clockwise as evidenced in FIG. 12. This is due to the thrust of the elastic means which tends to rotate planets 41, 42 in opposite directions, and ensures that the system find a backlash-free position with all planet gears keeping contact with the sun gear and the crown 60.

In a similar way, an embodiment with multiple elastic members 14 may be preloaded by a suitable arrangement of the respective specific section recesses for the elastic members. Still further embodiments may include elastic element(s) made with one or more preloaded springs or other equivalent means adapted to provide the desired preload between the planet carrier members 4, 5.

FIG. 13 is an example of an embodiment where the inventive assembly comprises a sun gear which also recovers the backlash, said sun gear having portions rotatable relative to each other and associated to the elastically connected planet carrier members. FIG. 13 in particular can be seen as a variant of the embodiment of FIGS. 1-3.

More in detail, the central gear 2 now comprises a first axial portion 201 and a second axial portion 202. The first portion 201 has a hollow shaft 203 and the second portion 202 has a shaft 204 coaxial with the hollow shaft 203.

The planet carrier 1 in this example comprises three disk-like planet carrier members 101, 102 and 103. The central member 102 is elastically connected to a lower member 103 by means of cross-shaped elastic joint $110_B$ accommodated in recess $113_B$. The upper member 101 is elastically connected to the lower member 103 by means of elastic joints $110_A$ which are accommodated in recesses 111 on the carrier members 101 (not shown in FIG. 13), 102 and 103. It may be appreciated that each of the upper and lower members 101, 103 is free to rotate relative to the central member 102, in an independent manner. The assembly comprises planet shafts 131, 132 and shafts 131 stemming from the upper member 101 pass through slots 113 of the other carrier members, in a manner similar to the previously described embodiment of FIGS. 1-3.

The short, hollow shaft 203 is integral with the upper carrier member 101, whilst the longer, coaxial shaft 204 is made integral with the lower carrier member 103. The shaft 204 is free to rotate inside the outer shaft 203. Hence, the gear parts 201, 202 may rotate relative to each other. The sun gear 2 of FIG. 13 is a composite sun gear made of two elastically preloaded sub-gears. FIGS. 14 and 15 show this effect in a manner similar to FIGS. 8 and 9. The misalignment between carrier members 101, 103 and related sun gear parts 201, 202 can be noted in FIG. 14.

The assembly of the planet carrier members 101, 102, 103 with relative sun gears 201, 202 and satellite gears 41, 42 can be arranged with different sequence according to other embodiments of the invention.

Figure 16:
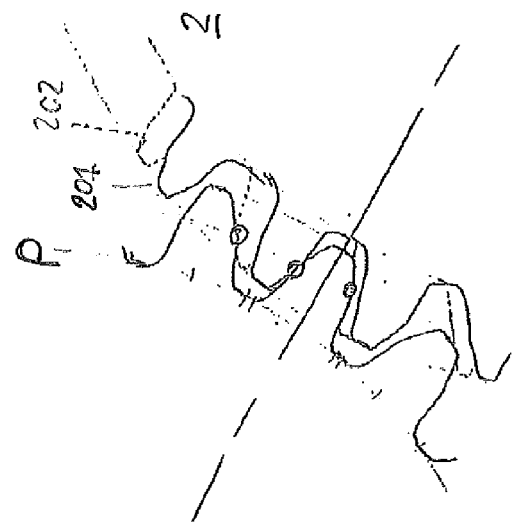
FIG. 16 shows a detail of the engagement of the sun gear of the assembly of FIG. 13 with a crown gear.

FIG. 16 shows the effect of backlash recovery operated by an embodiment with a composite sun gear such as that of FIG. 13. Teeth of the gear parts 201, 202 are rotationally displaced so that they abut on opposite sides of teeth of a planet gear, which is generally denoted with P, meshed with the composite sun gear 2. The part 201 is shown with continuous line and part 202 is shown with dotted line. Hence, regardless of the sense of rotation, a firm contact between teeth of the sun gear and teeth the planet wheels is ensured.

Figure 17:
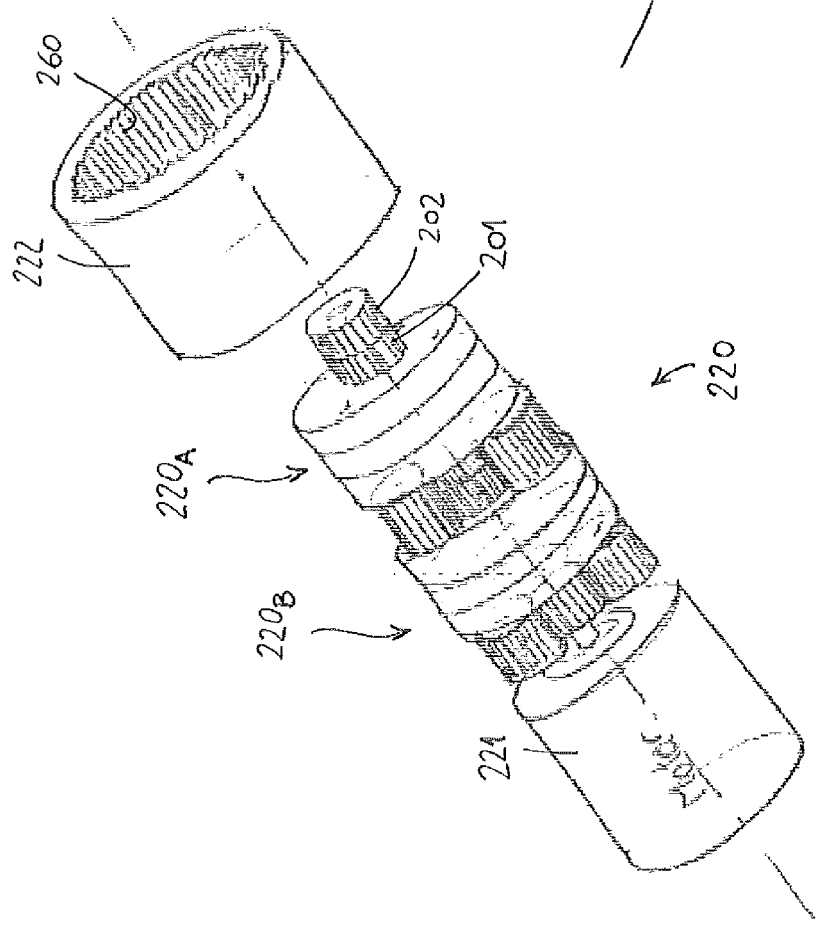
FIG. 17 is a view of a motor with a multi-stage reducer according to one of the embodiments of the invention.

FIG. 17 shows an example of a multi-stage reducer 220 comprising two stages 220-A and 220-B made in accordance with the embodiment of FIGS. 13 to 16. Some details are shown for the stage 220-A. The reducer comprises also a motor 221 and a cover 222 with a crown gear 260 which, in use, meshes with the planet gears.

Figure 18:
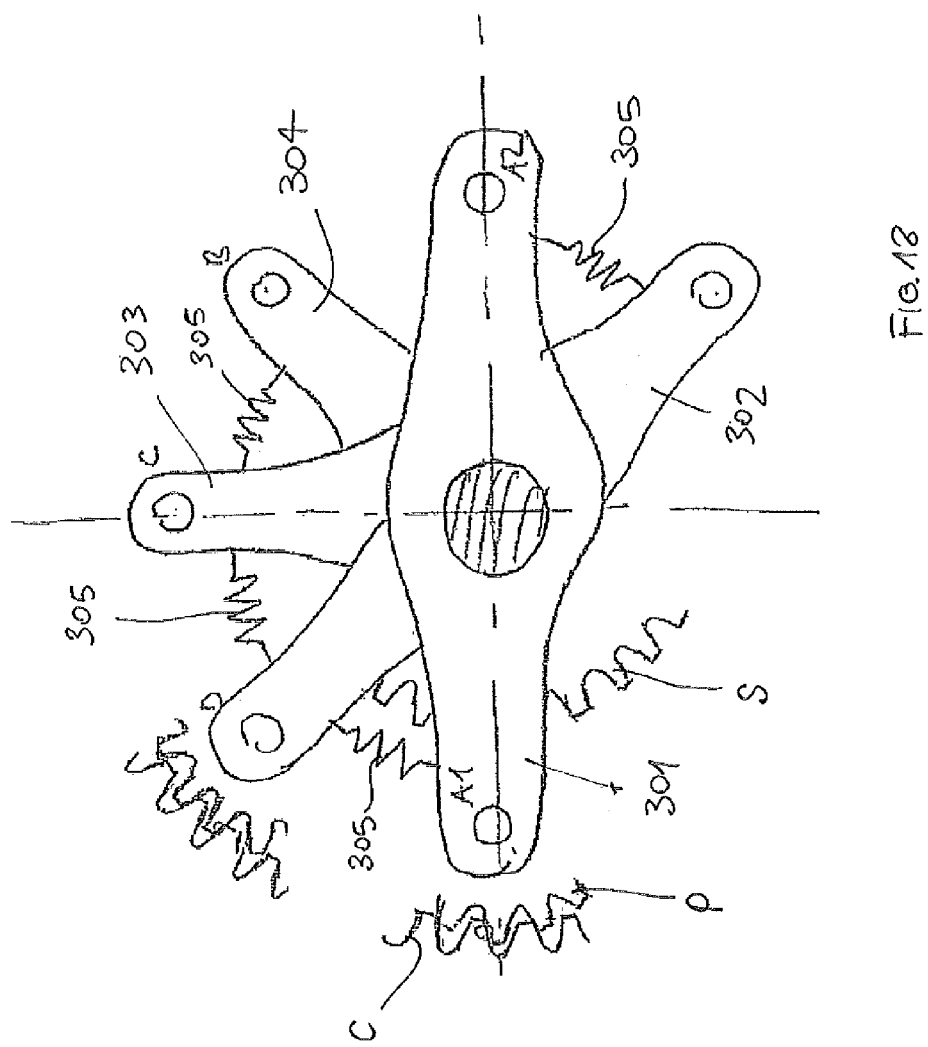
FIG. 18 is a view of another embodiment where the assembly comprises multiple planet carriers.

FIG. 18 is an example of other embodiments of the invention, where planet carrier members have the form of several planet carriers, rather than parts of a single planet carrier. For example, an assembly according to the invention comprises planet carriers 301, 302, 303 and 304. Preferably as shown, the planet carriers have an elongate shape carrying two planet wheels at opposite ends, but other shapes are possible, for example a star-like shape. The planet carriers are connected by springs 305 which act as the elastic members according to the invention and perform a similar function to members 10, 14 or $110_A$, $110_B$ of the previously described embodiments. Hence, in use, a preload is transferred to each couple of the planet wheels. For example in FIG. 18 the reference P denotes one of the planets P mounted on the first planet carrier 301; C denotes an outer geared crown meshed with the planets; S denotes a sun gear.

Figure 19:
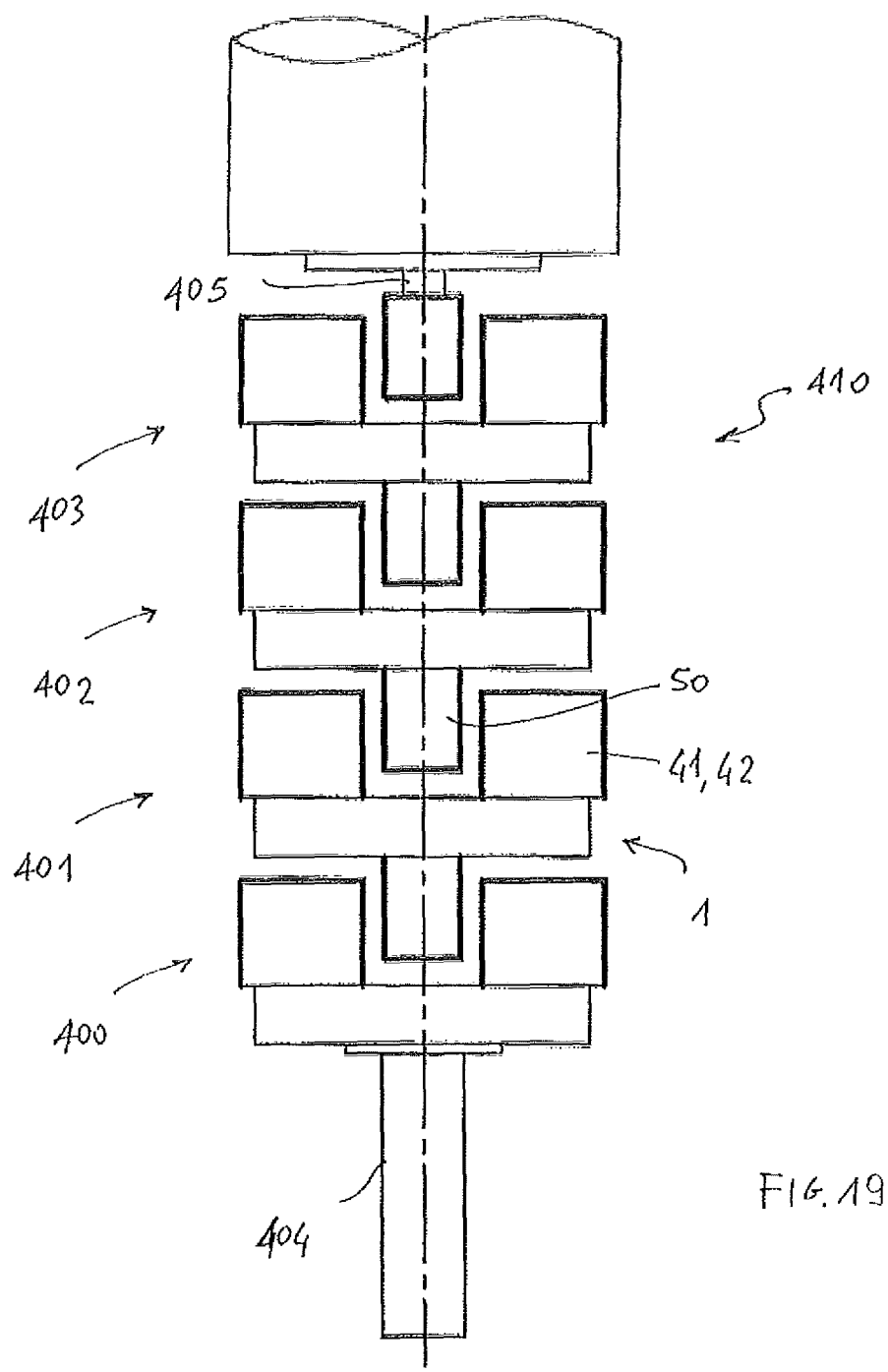
FIG. 19 is a scheme of a multi-stage planetary reducer according to an embodiment of the invention.

FIG. 19 illustrates, by way of an example, a planetary gear according to one of the embodiments of the invention, when used as a stage of a multi-stage reducer 410.

The reducer 410 has stages 400, 401, 402 and 403. The first stage 400 is coupled to an input shaft 404 and the last stage 403 transfers torque to an output shaft 405. The transmission ratio related to this invention is not affecting the usual limits of a gearhead. The planets 41, 42 of the stage 401, as shown, engage the central gear 450 fixed to rear side of the planet carrier of the following stage 402, this central gear becoming the sun gear of said planets. The planets of all stages 400 to 403 are also in engagement with an outer crown gear (not shown). The carrier 1 has a preloaded construction in accordance with any of the embodiments of the invention, for example with the planet carrier members 4, 5. In the example it is shown that stage 401 is the backlash-recovery stage of reducer 410, but any stage or all stages may be compensated in the same manner.

The invention claimed is:

1. A planetary gear assembly, comprising a central axis (7) and at least one planet gear wheel which is distanced from said central axis so that said at least one planet gear wheel revolves around said central axis when the gear assembly is in use, comprising at least a first planet carrier member and a second planet carrier member (4, 5; 101-103; 301-304), which are rotatable relative to each other around said central axis (7), and are connected by elastic means (10, 14, 110$_A$, 110$_B$, 305) arranged to elastically react to a rotation between said first and second planet carrier members, said elastic means being tensioned when said first planet carrier member and second planet carrier member are rotationally aligned in a design operation condition, so that the assembly, in use, is preloaded with a torque which tends to rotate said first planet carrier member relative to said second planet carrier member, characterized by: said assembly also comprising a sun gear (2), said sun gear comprising at least a first axial portion (201) and a second axial portion (202), which are rotatable relative to each other, said first axial portion of the sun gear being fixed to said first planet carrier member (101), and said second axial portion of the sun gear being fixed to said second planet carrier member (102).

2. The planetary gear assembly according to claim 1, said elastic means being torsional spring means.

3. The planetary gear assembly according to claim 2, said torsional spring means comprising at least one elastic element (10, 14, 110$_A$, 110$_B$) made of an elastically deformable material, and said element having a portion inserted in a recess of said first planet carrier member, and a remaining portion which is inserted in a recess of said second planet carrier member.

4. The planetary gear assembly according to claim 3, said torsional spring means comprising the at least one elastic element which is arranged in a central portion of the first and second planet carrier members.

5. The planetary gear assembly according to claim 4, the at least one elastic element being a cross-shaped element (10, 110$_A$, 110$_B$).

6. The planetary gear assembly according to claim 3, said torsional spring means comprising the at least one elastic element (14), the at least one elastic element (14) being preferably arranged in a peripheral region of the first and second planet carrier members.

7. The planetary gear assembly according to claim 3, the at least one elastic element being made of a non-metal material, including rubber, synthetic rubber or a synthetic material.

8. The planetary gear assembly according to claim 1, said elastic means comprising at least one spring, preferably a metal spring.

9. The planetary gear assembly according to claim 1, said first and second planet carrier members being separated by a plane of division (6) which is perpendicular to said central axis (7).

10. The planetary gear assembly according to claim 1, wherein the at least one planet gear wheel (41) is carried by said first planet carrier member, and wherein the planetary gear assembly further comprises a second planet gear wheel (42) carried by said second planet carrier member.

11. The planetary gear assembly according to claim 10, comprising at least a first planet shaft (31, 131) which is integral with said first planet carrier member, and at least a second planet shaft (32, 132) which is integral with said second planet carrier member, said first planet shaft (31) passing through a slot (13, 113) of said second planet carrier member.

12. The planetary gear assembly according to claim 1, further comprising one or more additional planet carrier members, wherein each of the first planetary carrier member, the second planet carrier member and the one or more additional planet carrier members is being rotatable relative to other members, each of the first planet carrier member, the second planet carrier member and the one or more additional planet carrier members carrying at least a respective planet wheel, and each of the first planet carrier member, the second planet carrier member and the one or more additional planet carrier members is being elastically connected to at least one of the other planet carrier members.

13. The planetary gear assembly according to claim 12, wherein each of the first planet carrier member, the second planet carrier member and the one or more additional planet carrier members (301-304) has an elongated shape.

14. The planetary gear assembly according to claim 1, said first axial portion of the sun gear having a first shaft (203); and said second axial portion of the sun gear having a second shaft (204) which is coaxial to the first shaft, said first shaft being connected to said first planet carrier member, and said second shaft being connected to said second planet carrier member.

15. The planetary gear assembly according to claim 1, implementing a gear reducer or a gear multiplier (220, 400).

16. The planetary gear assembly according to claim 15, wherein the gear reducer or the gear multiplier is being a multi-stage planetary device, or a hybrid device comprising planetary stages and conventional non-epicyclic spur stages.

* * * * *